(12) United States Patent
Nagai et al.

(10) Patent No.: US 8,923,183 B2
(45) Date of Patent: Dec. 30, 2014

(54) TERMINAL APPARATUS FOR TRANSMITTING OR RECEIVING A SIGNAL INCLUDING PREDETERMINED INFORMATION

(75) Inventors: Makoto Nagai, Kakamigahara (JP); Masaya Okumura, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 74 days.

(21) Appl. No.: 13/424,087

(22) Filed: Mar. 19, 2012

(65) Prior Publication Data
US 2012/0230327 A1    Sep. 13, 2012

Related U.S. Application Data

(63) Continuation of application No. PCT/JP2011/003737, filed on Jun. 29, 2011.

(30) Foreign Application Priority Data

Jun. 30, 2010  (JP) .................................. 2010-150270

(51) Int. Cl.
| | | |
|---|---|---|
| H04H 20/71 | (2008.01) | |
| G08G 1/16 | (2006.01) | |
| H04W 52/28 | (2009.01) | |
| H04W 68/00 | (2009.01) | |
| H04W 4/04 | (2009.01) | |

(52) U.S. Cl.
CPC ............. *G08G 1/163* (2013.01); *H04W 52/286* (2013.01); *H04W 68/005* (2013.01); *H04W 52/288* (2013.01); *H04W 4/046* (2013.01); *Y02B 60/50* (2013.01)
USPC .......................................................... 370/312

(58) Field of Classification Search
CPC ...... G08G 1/16; G08G 1/163; H04W 52/286; H04W 68/005; H04W 52/288; H04W 4/046; Y02B 60/50
USPC .............. 370/310.2, 312, 328, 331, 389, 392; 709/206, 217, 218, 228

See application file for complete search history.

(56) References Cited

U.S. PATENT DOCUMENTS

| | | | |
|---|---|---|---|
| 5,526,401 A | * | 6/1996 | Roach et al. ................ 455/426.1 |
| 6,263,207 B1 | * | 7/2001 | Kito .............................. 455/453 |

(Continued)

FOREIGN PATENT DOCUMENTS

| | | |
|---|---|---|
| JP | 2005-202913 A | 7/2005 |
| JP | 2008-219314 A | 9/2008 |

OTHER PUBLICATIONS

International Search Report issued in PCT/JP2011/003737 issued on Oct. 4, 2011.

(Continued)

*Primary Examiner* — Ricky Ngo
*Assistant Examiner* — Kabir Jahangir
(74) *Attorney, Agent, or Firm* — McDermott Will & Emery LLP

(57) ABSTRACT

An RF unit broadcasts a packet signal, and receives a packet signal broadcasted from another terminal apparatus. A processing unit generates a packet signal to be broadcasted and processes a received packet signal. A mode setting unit selects a first mode or a second mode as a broadcast mode. The RF unit sets first transmission power in case of the first mode and sets second transmission power lower than the first transmission power in case of the second mode. The processing unit includes an identification number uniquely allocated to the present terminal apparatus in a packet signal in case of the first mode, and includes an identification number commonly allocated to a system of terminal-to-terminal communication in a packet signal in case of the second mode.

5 Claims, 12 Drawing Sheets

(56) References Cited

U.S. PATENT DOCUMENTS

| | | |
|---|---|---|
| 8,073,484 B2 | 12/2011 | Sagou et al. |
| 2007/0100951 A1* | 5/2007 | Bae ................ 709/206 |
| 2007/0135150 A1* | 6/2007 | Ushiki et al. ............. 455/509 |
| 2008/0014926 A1* | 1/2008 | Ono ........................ 455/426.1 |
| 2008/0186206 A1 | 8/2008 | Reumerman |
| 2009/0316811 A1* | 12/2009 | Maeda et al. .............. 375/260 |
| 2010/0184442 A1* | 7/2010 | Nakaoka et al. .......... 455/445 |
| 2010/0220626 A1* | 9/2010 | Das et al. ................. 370/252 |
| 2010/0226318 A1* | 9/2010 | Nishio et al. ............. 370/329 |
| 2011/0102136 A1* | 5/2011 | Nakashima ............... 340/5.8 |
| 2011/0110258 A1* | 5/2011 | Ishii et al. ................. 370/252 |
| 2011/0111700 A1* | 5/2011 | Hackett .................... 455/41.2 |
| 2011/0244870 A1* | 10/2011 | Lee .......................... 455/444 |

OTHER PUBLICATIONS

Ishisono et al., "A study on Inter-Vehicle Communications of the Multi-Class Zone ITS Communication Scheme", IEICE Technical Report, Jul. 21, 2008, vol. 108, No. 171, pp. 13-18.

Munaka et al."A study of Secure Vehicle-to-Vehicle Communications based on IEEE 802.11p", Symposium on Multimedia, Distributed Cooperative and Mobile Systems, IPSJ Symposium Series, vol. 2007, No. 1, Jul. 4, 2007, pp. 548-552.

International Report on Patentability (PCT/IB/373)and the Written Opinion (PCT/ISA/237) issued in International Application No. PCT/JP2011/003737 issued Jan. 8, 2013.

English Translation Search Report issued in Chinese Patent Application No. 20118003381.3 dated Sep. 23, 2014.

* cited by examiner

TERMINAL APPARATUS FOR TRANSMITTING OR RECEIVING A SIGNAL INCLUDING PREDETERMINED INFORMATION

RELATED APPLICATIONS

This application is a Continuation of International Application No. PCT/JP2011/003737, filed on Jun. 29, 2011, which in turn claims the benefit of Japanese Application No. 2010-150270, filed on Jun. 30, 2010, the disclosures of which Applications are incorporated by reference herein.

BACKGROUND OF THE INVENTION

1. Field of the Invention

The present invention relates to a communication technique, and more particularly, to a terminal apparatus that transmits or receives a signal including predetermined information.

2. Description of the Related Art

Road-to-vehicle communication has been under review in an effort to prevent collision accidents of vehicles on a sudden encounter at an intersection. Inroad-to-vehicle communication, information related to a situation of an intersection is communicated between a roadside station and a vehicle station. Such road-to-vehicle communication requires installation of roadside stations, and so time and money increase.

On the other hand, inter vehicle communication, in which information is communicated between vehicle stations, does not require installation of roadside stations. In this case, for example, by detecting current position information using a global positioning system (GPS) or the like in real time and exchanging the position information between vehicle stations, roads where an own vehicle and another vehicle are located to enter an intersection are determined.

In wireless location area networks (LANs) that conform to standards such as IEEE802.11, an access control function called carrier sense multiple access with collision avoidance (CSMA/CA) is being used. In such a wireless LAN, therefore, a single wireless channel is shared by a plurality of terminal apparatuses. In such a CSMA/CA, a situation in which each other's wireless signals do not arrive, that is, a situation in which a carrier sense does not function occurs due to influence of a distance between terminal apparatuses or obstacles attenuating a radio wave. When the carrier sense does not function, packet signals transmitted from a plurality of terminal apparatuses collide with each other.

Meanwhile, when a wireless LAN is applied to inter vehicle communication, information needs to be transmitted to a large indefinite number of terminal apparatuses, and thus it is desirable to broadcast a signal. However, at a place such as an intersection, when the number of vehicles, that is, the number of terminal apparatuses increases, traffic increases, and so a collision between packet signals is considered to increase. In consequence, data included in a packet signal may not be transmitted to another terminal apparatus. When such a situation occurs in inter vehicle communication, objectives of preventing collision accidents of vehicles on a sudden encounter at an intersection are not achieved. Further, when road-to-vehicle communication is executed in addition to inter vehicle communication, communication is performed in various forms. At this time, it is required to reduce mutual influence between inter vehicle communication and road-to-vehicle communication.

Further, when a terminal apparatus mounted in a vehicle receives a packet signal from another terminal apparatus and detects an approach of another terminal apparatus, there may be a need to check whether or not another terminal apparatus is a specific terminal apparatus. For example, a situation in which an application for extracting an approach of only a specific vehicle is executed can be assumed. In order to realize this, an identification number for specifying a terminal apparatus of a broadcast source needs to be included in a packet signal. Here, an identification number is given as a number unique to a terminal apparatus. Meanwhile, since an identification number is included, there is a risk that a malicious user may track a vehicle in which a terminal apparatus is mounted.

SUMMARY OF THE INVENTION

The present invention is made in light of the foregoing, and it is an object of the present invention to provide a technique capable of reducing a risk that a vehicle in which a terminal apparatus is mounted may be tracked.

In order to achieve the above object, a terminal apparatus according to an embodiment of the present invention is a terminal apparatus for executing inter-terminal communication and includes a communication unit configured to receive a packet signal which is a packet signal broadcasted from another terminal apparatus and includes an identification number for identifying the other terminal apparatus, and a notifying unit configured to notify that a packet signal including the same identification number has been received more than once during a predetermined period when the communication units has received the packet signal including the same identification number more than once during the predetermined period.

One obtained by exchanging an arbitrary combination of the above components or representation of the present invention among a method, an apparatus, a recording medium, and a computer program is also effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
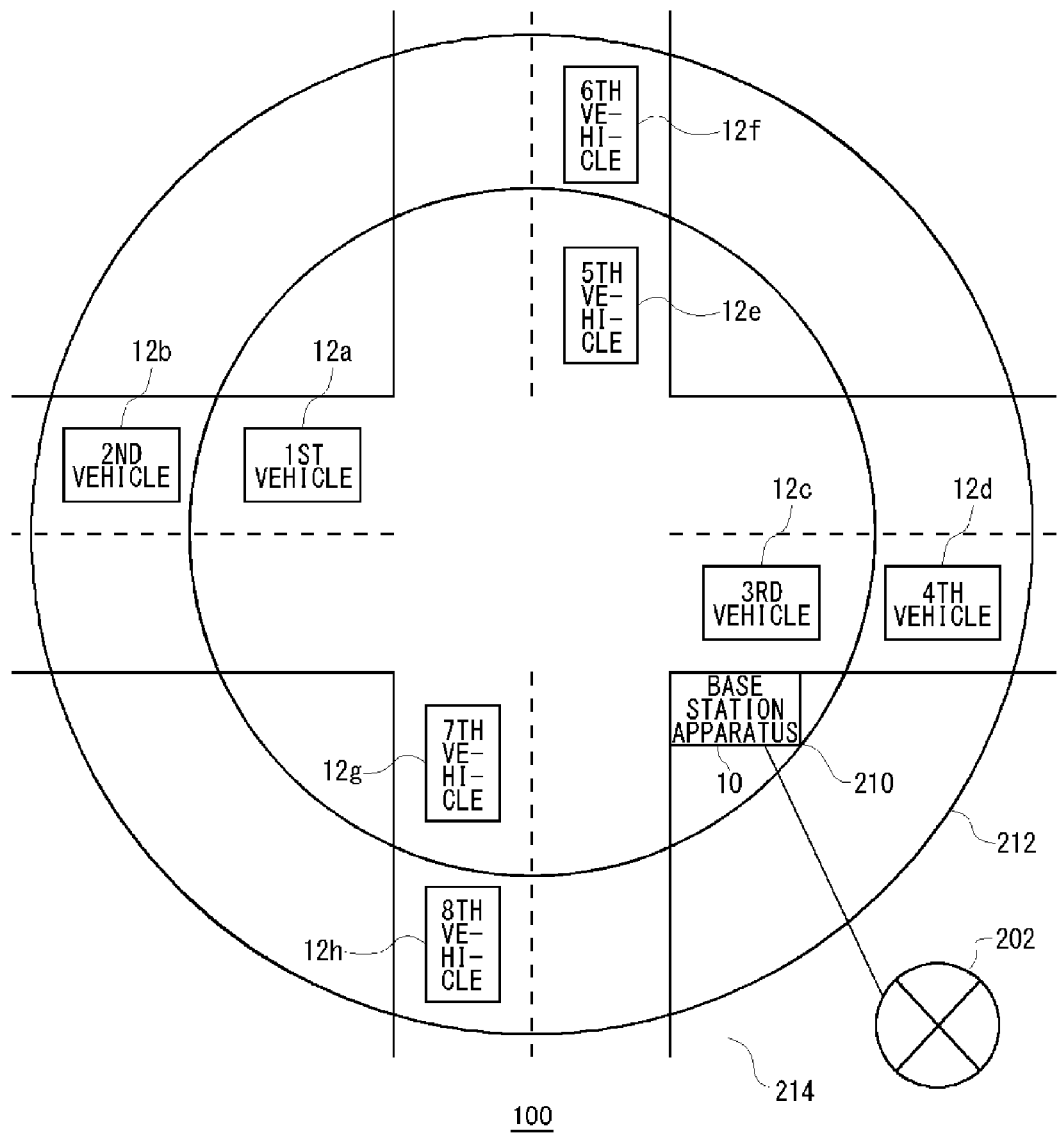
FIG. 1 is a diagram illustrating the configuration of a communication system according to an embodiment of the present invention.

The invention will now be described by reference to the preferred embodiments. This does not intend to limit the scope of the present invention, but to exemplify the invention.

An overview will be described before describing the present invention in detail. Embodiments of the present invention relate to a communication system in which not only inter vehicle communication between terminal apparatuses mounted in vehicles but also road-to-vehicle communication from a base station apparatus installed at an intersection or the like to a terminal apparatus are executed. In the inter vehicle communication, a terminal apparatus broadcasts a packet signal including information (hereinafter, referred to as "data") such as the speed or position of a vehicle. Another terminal apparatus receives the packet signal and recognizes, for example, an approach of a vehicle based on the data. In the road-to-vehicle communication, abase station apparatus repetitively specifies a frame including a plurality of subframes. The base station apparatus selects any one of a plurality of subframes and broadcasts a packet signal including control information and the like during a period of a head portion of the selected subframe.

The control information includes information related to a period (hereinafter, referred to as a "the road-to-vehicle transmission period") for a corresponding base station apparatus to broadcast a packet signal. The terminal apparatus specifies the road-to-vehicle transmission period based on the control information, and transmits a packet signal during a period other than the road-to-vehicle transmission period. As described above, since the road-to-vehicle communication and the inter vehicle communication are performed according to time division multiplexing, a probability that packets of both communications will collide with each other decreases. That is, the terminal apparatus checks the content of the control information, and so interference between the road-to-vehicle communication and the inter vehicle communication is reduced. Further, an area where the terminal apparatus executing the inter vehicle communication is present is mainly classified into three types.

One is an area (hereinafter, referred to as a "first area") defined around a base station apparatus. Another is an area (hereinafter, referred to as a "second area") defined outside the first area. The other is an area (hereinafter, referred to as a "second area outside area") defined outside the second area. In the first area and the second area, a terminal apparatus can receive a packet signal from a base station apparatus with a certain level of quality. However, in the second area outside area, it is difficult for a terminal apparatus to receive a packet signal from a base station apparatus with a certain level of quality. The first area is defined to be closer to the center of an intersection than the second area. Since a vehicle present in the first area is a vehicle present at the position close to an intersection, a packet signal from a terminal apparatus mounted in the vehicle is important information in terms of inhibition of collision accidents.

In response to definition of such areas, a period (hereinafter, referred to as an "inter vehicle transmission period") for the inter vehicle communication is specified by time division multiplexing of a priority period and a general period. The priority period refers to a period used by a terminal apparatus present in the first area, and the terminal apparatus transmits a packet signal in any one of a plurality of slots forming the priority period. The general period refers to a period used by a terminal apparatus present in the second area, and the terminal apparatus transmits a packet signal by the CSMA scheme during the general period. A terminal apparatus present in the second area outside area transmits a packet signal according the CSMA scheme regardless of the configuration of a frame. Here, a terminal apparatus mounted in a vehicle determines an area where the own vehicle is present.

A packet signal broadcasted from a terminal apparatus includes an identification number for identifying a corresponding terminal apparatus. An approach of a vehicle in which a specific terminal apparatus is mounted is detected using the identification number. However, there is a risk that information may be misused, for example, a vehicle in which a specific terminal apparatus is mounted may be tracked. In order to cope with it, a terminal apparatus according to the present embodiment includes an identification number allocated uniquely to a terminal apparatus in a packet signal in a mode (hereinafter, referred to as a "first mode") in which a packet signal is usually broadcasted, and then broadcasts the resultant packet signal at a predetermined transmission power (hereinafter, referred to as "first transmission power").

Meanwhile, a terminal apparatus receives a packet signal from another terminal apparatus. The terminal apparatus checks an identification number included in each packet signal. When the same identification number is received a threshold or more during a predetermined period, it is estimated that it is tracked by a vehicle in which another terminal apparatus having the corresponding identification number is mounted. After the estimation, the terminal apparatus transitions from the first mode to a mode (hereinafter, referred to as a "second mode") for broadcasting a packet signal while tracking is being made. In the second mode, the terminal apparatus includes an identification number commonly allocated to the communication system in a packet signal and then broadcasts the packet signal at transmission power (hereinafter, referred to as "second transmission power") lower than the first transmission power.

FIG. 1 illustrates the configuration of a communication system 100 according to an embodiment of the present invention. This corresponds to an example in which one intersection is viewed from above. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as a vehicle 12, and a network 202. A terminal apparatus (not shown) is mounted in each vehicle 12. A first area 210 is defined around the base station apparatus 10, a second area 212 is defined outside the first area 210, and a second area outside area 214 is defined outside the second area 212.

As illustrated in FIG. 1, a road extending in a horizontal direction in FIG. 1, i.e., in a left-right direction intersects with a road extending in a vertical direction in FIG. 1, i.e., in an up-down at a central portion. In FIG. 1, an upper side corresponds to "north" as a bearing, a left side corresponds to "west" as a bearing, a lower side corresponds to "south" as a bearing, and a right side corresponds to "east" as a bearing. An intersecting portion of two roads is referred to as an "intersection." The first vehicle 12a and the second vehicle 12*b* are moving from the left to the right, and the third vehicle 12*c* and the fourth vehicle 12*d* are moving the right to the left. The fifth vehicle 12*e* and the sixth vehicle 12*f* are moving downward, and the seventh vehicle 12*g* and the eighth vehicle 12*h* are moving upward.

In the communication system 100, the base station apparatus 10 is arranged at the intersection. The base station apparatus 10 controls communication between terminal apparatuses. The base station apparatus 10 repetitively generates a frame including a plurality of subframes based on signals received from GPS satellites (not shown) or a frame generated by another base station apparatus 10 (not shown). The road-to-vehicle transmission period is specified to be set to a head portion of each subframe. The base station apparatus 10 selects a subframe to which the road-to-vehicle transmission period is not set by another base station apparatus 10 among a plurality of subframes. The base station apparatus 10 sets the road-to-vehicle transmission period to the head portion of the selected subframe. The base station apparatus 10 includes control information including information related to the road-to-vehicle transmission period and the like in a packet signal. The base station apparatus 10 also includes predetermined data in the packet signal. The base station apparatus 10 broadcasts the packet signal during the set the road-to-vehicle transmission period.

Various kinds of data may be included in the packet signal. One is data such as traffic jam information or construction information. Another is data related to each slot included in the priority period. The latter includes a slot (hereinafter, referred to as an "empty slot") which is not used by any terminal apparatus, a slot (hereinafter, referred to as an "in-use slot") used by one terminal apparatus, and a slot (hereinafter, referred to as a "collision slot") which is being used by a plurality of terminal apparatuses. A packet signal (hereinafter, referred to as an "RSU packet signal") including data such as traffic jam information or construction information and a packet signal (hereinafter referred to as a "control packet signal") including data related to each slot are separately generated. The RSU packet signal and the control packet signal are collectively referred to as a "packet signal."

In response to a reception status when the terminal apparatus receives the packet signal from the base station apparatus 10, the first area 210 and the second area 212 are defined around the communication system 100. As illustrated in FIG. 1, the first area 210 is defined near the base station apparatus 10 as an area where the reception status is relatively good. In other words, the first area 210 is defined near the central portion of the intersection. The second area 212 is defined outside the first area 210 as an area where the reception status is worse than that of the first area 210. Further, the second area outside area 214 is defined outside the second area 212 as an area where the reception status is worse than that of the second area 212. An error rate or reception power of the packet signal may be used as the reception status.

A packet signal from the base station apparatus 10 includes two types of control information. One is information (hereinafter, referred to as a "basic part") related to the set road-to-vehicle transmission period, and the other is information (hereinafter, referred to as an "extension part") related to the set priority period. The terminal apparatus generates a frame based on the basic part included in the packet signal. As a result, a frame generated by each of a plurality of terminal apparatuses is synchronized with a frame generated by the base station apparatus 10. The terminal apparatus receives a packet signal broadcasted by the base station apparatus 10, and estimates which area among the first area 210, the second area 212, and the second area outside area 214 the vehicle is present based on the reception status and the extension part of the received packet signal. When it is estimated that the vehicle is present in the first area 210, the terminal apparatus broadcasts a packet signal through any one of slots included in the priority period. When it is estimated that the vehicle is present in the second area 212, the terminal apparatus broadcasts a packet signal through a carrier sense during the general period. Thus, time division multiplexing access (TDMA) is executed during the priority period, and CSMA/CA is executed during the general period.

The terminal apparatus selects a subframe having the same relative timing even in a next frame. Particularly, the terminal apparatus selects a slot having the same relative timing in the priority period of the next frame. Here, the terminal apparatus acquires data and includes the data in a packet signal. For example, information related to a presence position is included as the data. The terminal apparatus also includes control information in the packet signal. That is, the control information transmitted from the base station apparatus 10 is transferred by the terminal apparatus. Meanwhile, when it is estimated that the vehicle is present in the second area outside area 214, the terminal apparatus executes CSMA/CA regardless of the configuration of a frame and then broadcasts the packet signal.

Figure 2:
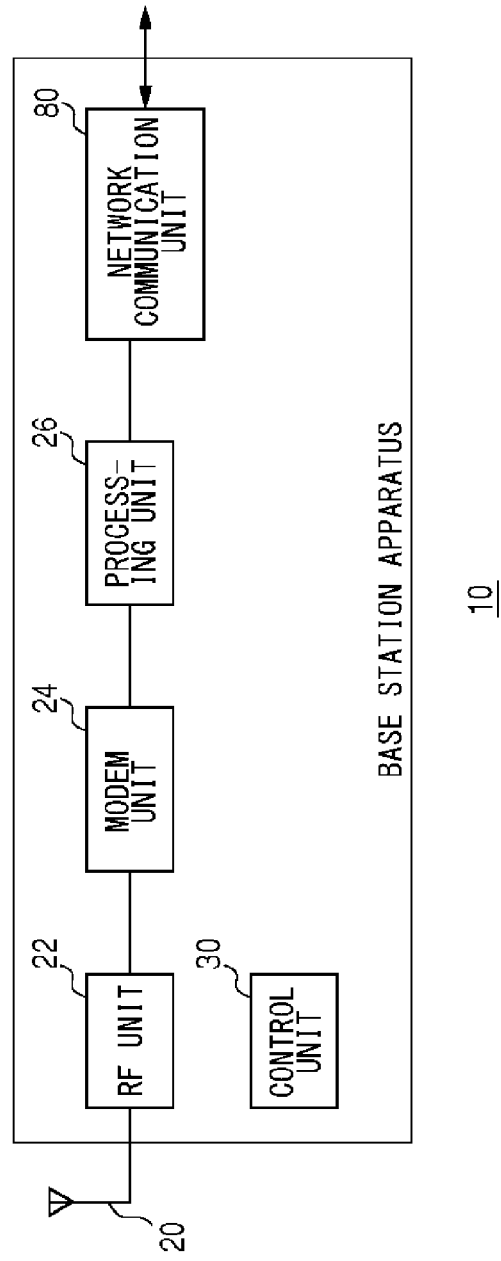
FIG. 2 is a diagram illustrating the configuration of a base station apparatus of FIG. 1.

FIG. 2 illustrates the configuration of the base station apparatus 10. The base station apparatus 10 includes an antenna 20, a radio frequency (RF) unit 22, a modem unit 24, a processing unit 26, a control unit 30, and a network communication unit 80. The RF unit 22 receives a packet signal from a terminal apparatus or another base station apparatus 10 (not shown) through the antenna 20 as a reception process. The RF unit 22 executes frequency transform on the packet signal of the received radio frequency, and generates a baseband packet signal. The RF unit 22 outputs the baseband packet signal to the modem unit 24. Generally, the baseband packet signal includes an in-phase component and a quadrature component, and so two signal lines need to be illustrated. However, in order to make clear illustration, only one signal line is here illustrated. The RF unit 22 further includes a low noise amplifier (LNA), a mixer, an automatic gain control (AGC), and an analog-to-digital (A/D) converting unit.

The RF unit 22 executes frequency transform on the baseband packet signal input from the modem unit 24 as a transmission process, and generates a radio frequency packet signal. The RF unit 22 transmits the radio frequency packet signal through the antenna 20 during the road-to-vehicle transmission period. The RF unit 22 further includes a power amplifier (PA), a mixer, and a digital-to-analog (D/A) converting unit.

The modem unit 24 demodulates the baseband packet signal from the RF unit 22 as the reception process. The modem unit 24 outputs the demodulation result to the processing unit 26. The modem unit 24 modulates data from the processing unit 26 as the transmission process. The modem unit 24 outputs the modulated baseband packet signal to the RF unit 22. Since the communication system 100 supports an orthogonal frequency division multiplexing (OFDM) modulation scheme, the modem unit 24 executes fast Fourier transform (FFT) as the reception process and executes inverse fast Fourier transform (IFFT) as the transmission process.

Figure 3:
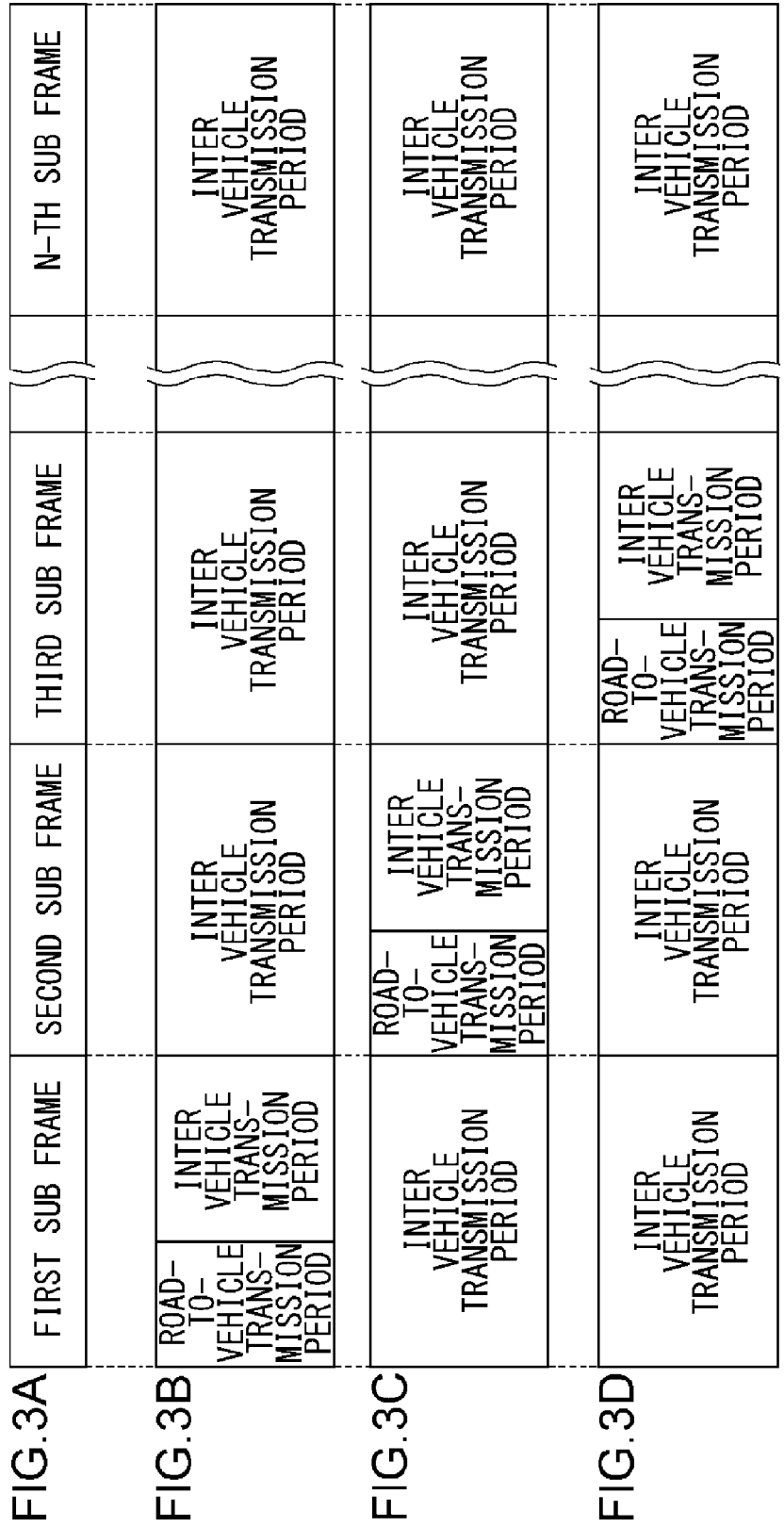
FIGS. 3(a) to 3(d) are diagrams illustrating a format of a frame specified in the communication system of FIG. 1.

The processing unit 26 receives signals from GPS satellites (not shown) and acquires time information based on the received signals. The time information can be acquired by a known technique, and a description thereof will not be made. The processing unit 26 generates a plurality of frames based on the time information. For example, the processing unit 26 generates 10 frames each having the length of "100 msec" by dividing a period of 1 sec based by 10 based on timing represented by the time information. This process is repeated, and so a frame is specified to be repeated. The processing unit 26 may detect the control information based on the demodulation result and generate a frame based on the detected control information. This process corresponds to generating a frame synchronized with timing of a frame generated by another base station apparatus 10. FIGS. 3(a) to 3(d) illustrate a format of a frame specified in the communication system 100. FIG. 3(a) illustrates the configuration of a frame. The frame includes N subframes represented by a first subframe to an N-th subframe. For example, when the length of a frame is 100 msec and N is 8, a subframe having the length of 12.5 msec is specified. FIGS. 3(b) to 3(d) will be described later, and a description will continue with reference back to FIG. 2.

The processing unit 26 selects a subframe to which the road-to-vehicle transmission period is to be set among a plurality of subframes included in a frame. Specifically, the processing unit 26 receives a frame specified by the processing unit 26. The processing unit 26 receives a demodulation result from another base station apparatus 10 or another terminal apparatus (not shown) through the RF unit 22 and the modem unit 24. The processing unit 26 extracts a demodulation result from another base station apparatus 10 among input demodulation results. An extraction method will be described later. The processing unit 26 specifies a subframe through which a demodulation result is not received by specifying a subframe through which a demodulation result is received. This corresponds to specifying a subframe to which the road-to-vehicle transmission period is not set by another base station apparatus 10, i.e., a non-used subframe. When a plurality of non-used subframes are present, the processing unit 26 randomly selects one subframe. When a non-used subframe is not present, that is, when all of a plurality of subframes are being used, the processing unit 26 acquires reception power corresponding to the demodulation result and preferentially selects a subframe having small reception power.

FIG. 3(b) illustrates the configuration of a frame generated by a first base station apparatus 10a. The first base station apparatus 10a sets the road-to-vehicle transmission period to a head portion of the first subframe. The first base station apparatus 10a sets the inter vehicle transmission period following the road-to-vehicle transmission period in the first subframe. The inter vehicle transmission period refers to a period during which a terminal apparatus can broadcast a packet signal. In other words, it is specified that the first base station apparatus 10a can broadcast a packet signal during the road-to-vehicle transmission period which is a head period of the first subframe, and the terminal apparatus can broadcast a packet signal during the inter vehicle transmission period other than the road-to-vehicle transmission period in the frame. The first base station apparatus 10a sets only the inter vehicle transmission period to the second subframe to the N-th subframe.

FIG. 3(c) illustrates the configuration of a frame generated by a second base station apparatus 10b. The second base station apparatus 10b sets the road-to-vehicle transmission period to a head portion of the second subframe. The second base station apparatus 10b sets the inter vehicle transmission period to a portion following the road-to-vehicle transmission period in the second subframe, the first subframe, and the third subframe to the N-th subframe. FIG. 3(d) illustrates the configuration of a frame generated by a third base station apparatus 10c. The third base station apparatus 10c sets the road-to-vehicle transmission period to a head portion of the third subframe. The third base station apparatus 10c sets the inter vehicle transmission period to a portion following the road-to-vehicle transmission period in the third subframe, the first subframe, the second subframe, and the fourth subframe to the N-th subframe. As described above, a plurality of base station apparatuses 10 select different subframes, and set the road-to-vehicle transmission period to the head portions of the selected subframes. A description will continue with reference back to FIG. 2.

Figure 4:
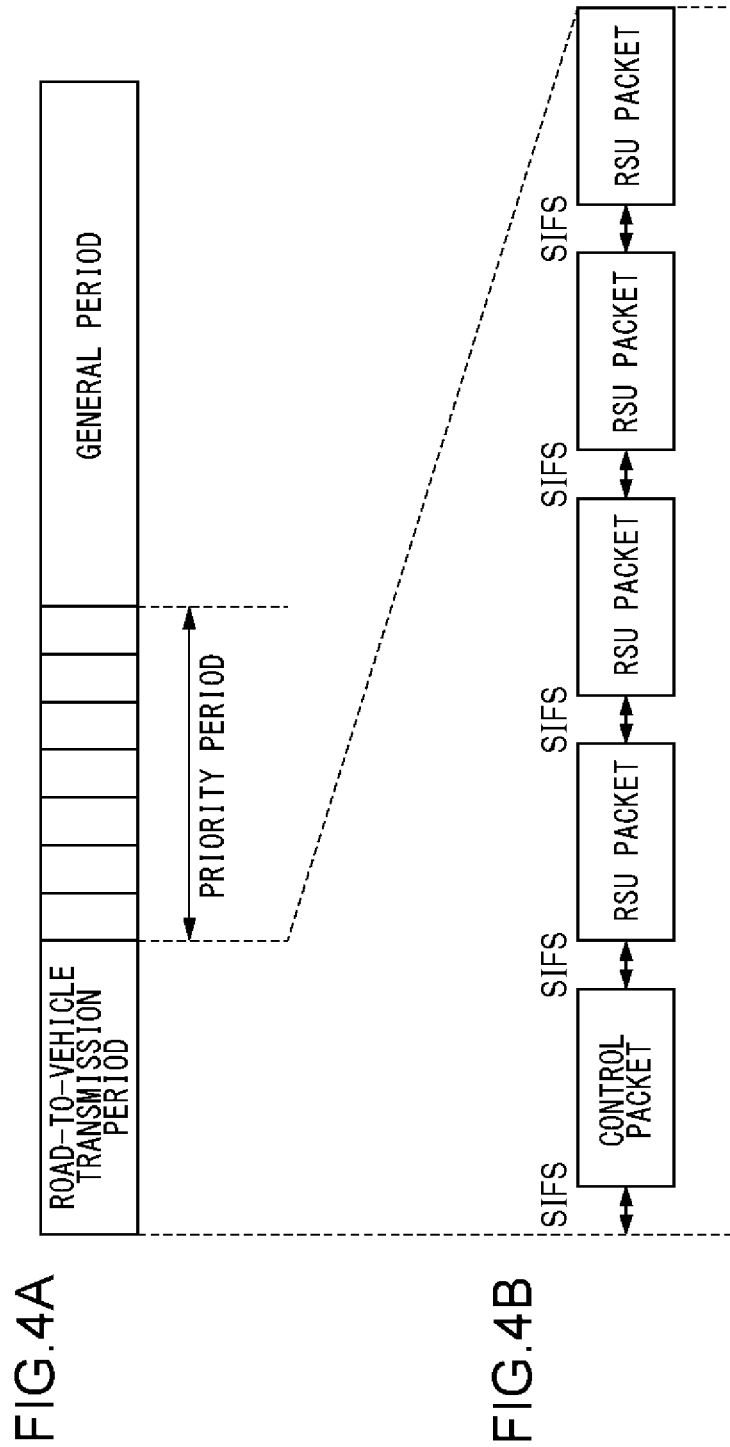
FIGS. 4(a) and 4(b) are diagrams illustrating the configuration of a subframe of FIGS. 3(a) to 3(d)

The processing unit 26 specifies whether each of a plurality of slots included in the priority period is in a non-used state, is in use, or collides with another slot. Here, the configuration of a subframe will be first described before describing processing of the processing unit 26. FIGS. 4(a) and 4(b) illustrate the configuration of a subframe. As illustrated in FIGS. 4(a) and 4(b), one subframe is configured such that the road-to-vehicle transmission period, the priority period, and the general period are arranged in order. During the road-to-vehicle transmission period, the base station apparatus 10 broadcast a packet signal. The priority period is defined by time division multiplexing of a plurality of slots, and the terminal apparatus 14 can broadcast a packet signal through each slot. The general period has a predetermined length, and the terminal apparatus 14 can broadcast a packet signal during the general period. The priority period and the general period correspond to the inter vehicle transmission period of FIG. 3(b) or the like. Further, when the subframe does not include the road-to-vehicle transmission period, the subframe is configured such that the priority period and the general period are arranged in order. At this time, the priority period is used as the road-to-vehicle transmission period. FIG. 4(b) will be described later. A description will continue with reference back to FIG. 3.

The processing unit 26 measures an error rate of each slot as well as reception power of each slot. For example, a bit error rate (BER) may be used as the error rate. When the reception power is lower than a reception power threshold, the processing unit 26 determines that a corresponding slot is not used (hereinafter, this slot is referred to as an "empty slot"). However, when the reception power is the reception power threshold or more but the error rate is lower than an error rate threshold, the processing unit 26 determines that a corresponding slot is being used (hereinafter, this slot is referred to as an "in-use slot"). Further, when the reception power is the reception power threshold or more but the error rate is the error rate threshold or more, the processing unit 26 determines that a corresponding slot collides with another slot (hereinafter, this slot is referred to as a "collision slot"). The processing unit 26 executes this process on all slots.

The processing unit 26 sets the road-to-vehicle transmission period to a subframe of a received subframe number, and generates a control packet signal and an RSU packet signal to be broadcasted during the road-to-vehicle transmission period. FIG. 4(b) illustrates an arrangement of a packet signal in the road-to-vehicle transmission period. As illustrated in FIG. 4(b), one control packet signal and a plurality of RSU packet signals are arranged in the road-to-vehicle transmission period. Here, preceding and subsequent packet signals are separated by a short interframe space (SIFS). A description will continue with reference back to FIG. 2.

Figure 5:
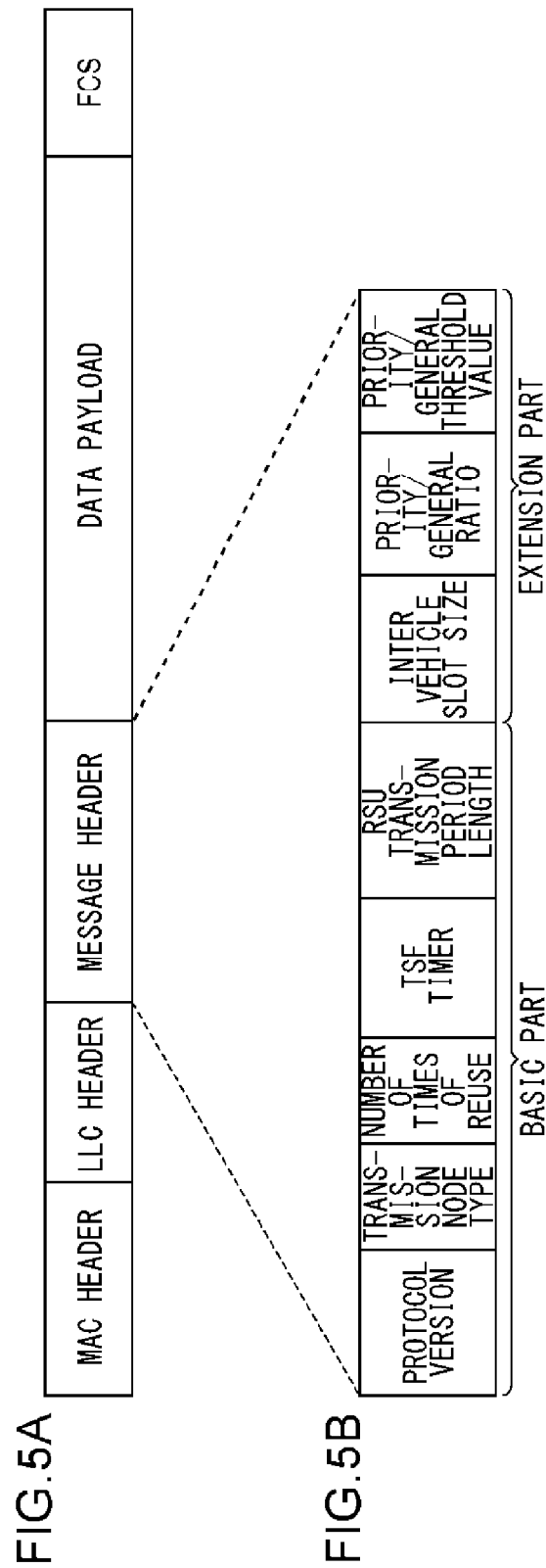
FIGS. 5(a) and 5(b) are diagrams illustrating a format of a MAC frame included in a packet signal specified in the communication system of FIG. 1.

Here, configurations of the control packet signal and the RSU packet signal will be described. FIGS. 5(a) and 5(b) illustrate a format of a MAC frame included in a packet signal specified in the communication system 100. FIG. 5(a) illustrates a format of a MAC frame. The MAC frame is configured such that a "MAC header," an "LLC header," a "message header," a "data payload," and a "frame check sequence (FCS)" are arranged in order from the head. When the data payload includes a detection result, a packet signal including this MAC frame corresponds to the control packet signal. When data such as traffic jam information or construction information is received from the network communication unit 80, the processing unit 26 includes the data in the data payload. A packet signal including this MAC frame corresponds to the RSU packet signal. Here, the network communication unit 80 is connected to the network 202 (not illustrated). The MAC frame illustrated in FIG. 5(a) is included even in the packet signal to be broadcasted during the priority period or the general period.

FIG. 5(b) is a diagram illustrating a configuration of a message header generated by the processing unit 26. The message header includes a basic part and an extension part. Since the control packet signal and the RSU packet signal have the same configuration as described above, both the control packet signal and the RSU packet signal include a basic part and an extension part. The basic part includes a "protocol version," a "transmission node type," a "number of times of reuse," a "TSF timer," and an "RSU transmission period length." The extension part includes an "inter vehicle slot size," a "priority general ratio," and a "priority general threshold."

The protocol version represents a version of a corresponding protocol. The transmission node type represents a transmission source of a packet signal including a MAC frame. For example, "0" represents a terminal apparatus, and "1" represents the base station apparatus 10. The processing unit 26 uses a value of the transmission node type when the processing unit 26 extracts a demodulation result from another base station apparatus 10 among input demodulation results. The number of times of reuse represents an index of validity when the message header is transferred by the terminal apparatus, and the TSF timer represents a transmission time. The RSU transmission period length represents the length of the road-to-vehicle transmission period, and so it is information related to the road-to-vehicle transmission period.

The inter vehicle slot size represents the size of a slot included in the priority period. The priority general ratio represents a ratio of the priority period and the general period. The priority general threshold represents a threshold that causes the terminal apparatus 14 to select use of the priority period or use of the general period and is a threshold on the reception power. The extension part corresponds to information related to the priority period and the general period. The description will continue with reference back to FIG. 2.

The processing unit 26 causes the modem unit 24 and the RF unit 22 to broadcast a packet signal during the road-to-vehicle transmission period. In other words, the processing unit 26 broadcasts the control packet signal and the RSU packet signal including the basic part and the extension part during a base station broadcast period. The control unit 30 controls processing of the base station apparatus 10 in general.

This configuration can be implemented by hardware such as a central processing unit (CPU) of an arbitrary computer, memory, and other LSIs or can be implemented by software such as a program loaded onto memory. However, FIG. 2 illustrates functional blocks implemented by a combination of hardware and software. Thus, it should be understood by those skilled in the art that these functional blocks can be implemented by only hardware, only software, or a combination thereof.

Figure 6:
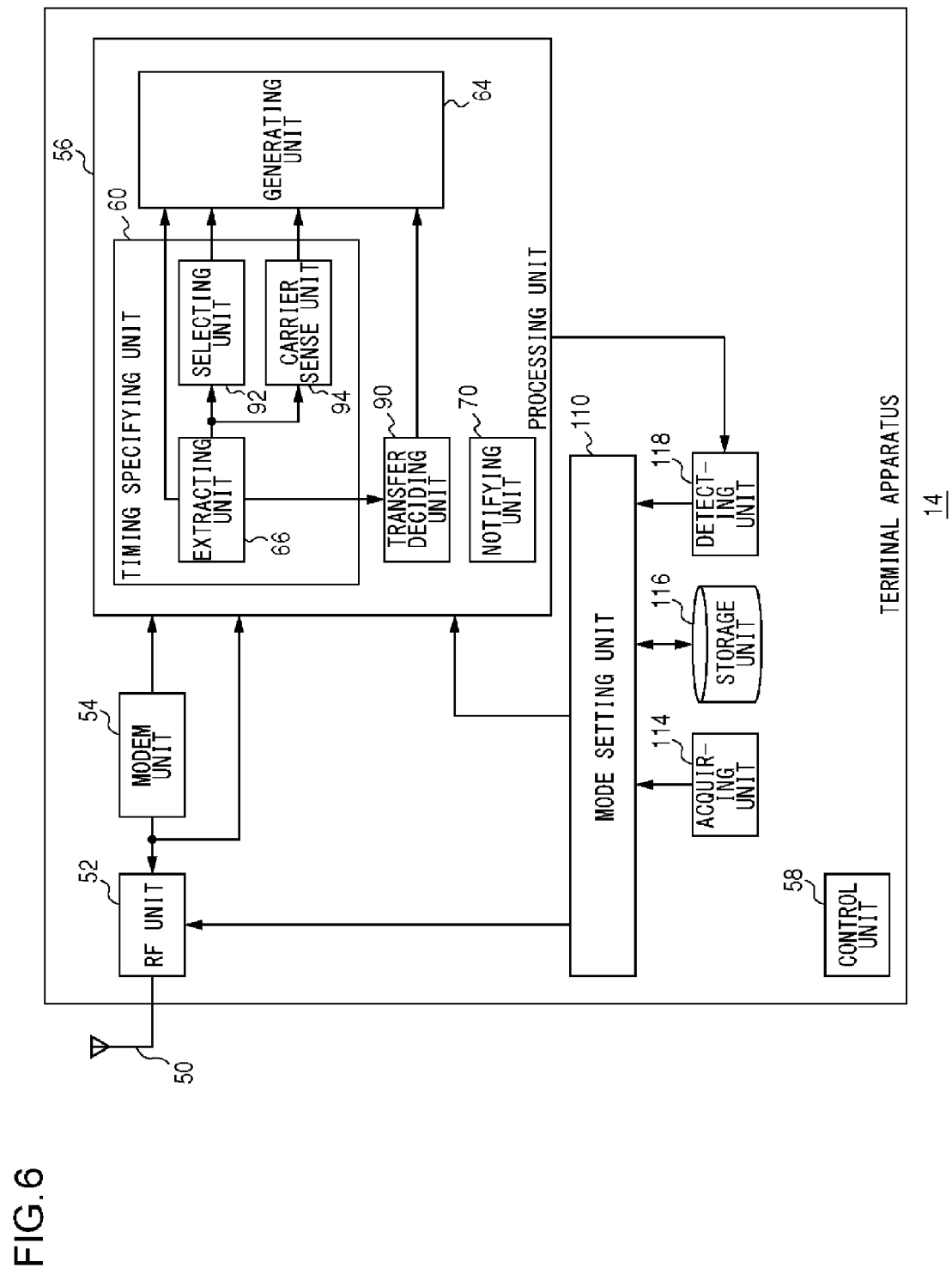
FIG. 6 is a diagram illustrating the configuration of a terminal apparatus mounted in a vehicle of FIG. 1.

FIG. 6 illustrates a configuration of the terminal apparatus 14 mounted in the vehicle 12. The terminal apparatus 14 includes an antenna 50, an RF unit 52, a modem unit 54, a processing unit 56, a control unit 58, a mode setting unit 110, an acquiring unit 114, a storage unit 116, and a detecting unit 118. The processing unit 56 includes a generating unit 64, a timing specifying unit 60, a transfer deciding unit 90, and a notifying unit 70. The timing specifying unit 60 includes an extracting unit 66, a selecting unit 92, and a carrier sense unit 94. The antenna 50, the RF unit 52, and the modem unit 54 execute the same process as the antenna 20, the RF unit 22, and the modem unit 24 illustrated in FIG. 2. Thus, a description will be here made focusing on different points.

The modem unit 54 and the processing unit 56 receive a packet signal from another terminal apparatus 14 or the base station apparatus 10 (not illustrated). Further, the modem unit 54 and the processing unit 56 receive a packet signal from the base station apparatus 10 during the road-to-vehicle transmission period as described above. The modem unit 54 and the processing unit 56 receive a packet signal from another terminal apparatus 14 during the priority period or the general period as described above.

When the demodulation result from the modem unit 54 is a packet signal transmitted from the base station apparatus 10 (not illustrated), the extracting unit 66 specifies timing of a subframe in which the road-to-vehicle transmission period is arranged. Further, the extracting unit 66 generates a frame based on the timing of the subframe and the content of the basic part of the message header of the packet signal, specifically, the content of the RSU transmission period length. The frame is preferably generated in the same way as in the processing unit 26, and thus a description thereof will not be repeated. As a result, the extracting unit 66 generates a frame synchronized with a frame generated by the base station apparatus 10.

The extracting unit 66 measures reception power of the packet signal transmitted from the base station apparatus 10. The extracting unit 66 estimates which area among the first area 210, the second area 212, and the second area outside area 214 the terminal apparatus is present based on the measured reception power. For example, the extracting unit 66 stores an area determination threshold. The area determination threshold corresponds to the above described priority general threshold. When the reception power is larger than the area determination threshold, the extracting unit 66 decides that the terminal apparatus is present in the first area 210. However, when the reception power is the area determination threshold or less, the extracting unit 66 decides that the terminal apparatus is present in the second area 212. When the packet signal is not received from the base station apparatus 10, the extracting unit 66 decides that the terminal apparatus is present outside the second area 212. The extracting unit 66 may use the error rate or a combination of the reception power and the error rate, instead of the reception power.

The extracting unit 66 decides whether an area where the terminal apparatus is currently present is a priority area or a general area based on the estimation result. The extracting unit 66 selects the priority area when the vehicle is present in the first area 210 and selects the general area when the vehicle is present in the second area 212. Further, when it is estimated that the vehicle is present in the second area outside area 214, the extracting unit 66 selects timing unrelated to a configuration of a frame. The extracting unit 66 selects the general period when the general area is selected. The extracting unit 66 selects the priority period when the priority area is selected. The extracting unit 66 outputs a detection result included in a data payload of the control packet signal to the selecting unit 92 when the priority period is selected. The extracting unit 66 outputs timing of a frame and a subframe and information related to the inter vehicle transmission period to the carrier sense unit 94 when the general period is selected. The extracting unit 66 instructs the carrier sense unit 94 to execute the carrier sense when timing unrelated to a configuration of a frame is selected.

The selecting unit 92 receives a detection result from the extracting unit 66. As described above, the detection result represents which one among an empty slot, an in-use slot, and a collision slot each of a plurality of slots included in the priority period corresponds to. The selecting unit 92 selects any one of empty slots. In the case a slot has been already selected, when a corresponding slot is an in-use slot, the selecting unit 92 continuously selects the same slot. Further, in the case a slot has been already selected, when a corresponding slot is a collision slot, the selecting unit 92 newly selects an empty slot. The selecting unit 92 notifies the generating unit 64 of information related to the selected slot as transmission timing.

The carrier sense unit 94 receives timing of a frame and a subframe and information related to the inter vehicle transmission period from the extracting unit 66. The carrier sense unit 94 executes the carrier sense in the general period and so measures interference power. The carrier sense unit 94 decides transmission timing in the general period based on the interference power. Specifically, the carrier sense unit 94 stores a predetermined threshold in advance, and compares the interference power with the threshold. When the interference power is lower than the threshold, the carrier sense unit 94 decides transmission timing. When an instruction to execute the carrier sense is given from the extracting unit 66, the carrier sense unit 94 executes CSMA without considering a configuration of a frame, and so decides transmission timing. The carrier sense unit 94 notifies the generating unit 64 of the decided transmission timing.

The transfer deciding unit 90 controls transfer of the message header. The transfer deciding unit 90 extracts the message header from the packet signal. When the packet signal has been transmitted directly from the base station apparatus 10, the number of times of reuse is set to "0". However, when a packet signal has been transmitted from another terminal apparatus 14, the number of times of reuse is set to a value of "1 or more". The transfer deciding unit 90 selects a message header to be transferred from among the extracted message headers. Here, for example, a message header whose number of times of reuse is smallest is selected. Further, the transfer deciding unit 90 may generate a new message header by synthesizing contents included in a plurality of message headers. The transfer deciding unit 90 outputs a message header of a selection target to the generating unit 64. At this time, the transfer deciding unit 90 increases the number of times of reuse by "one."

The generating unit 64 includes a GPS receiver, a gyroscope, a vehicle speed sensor, and the like (not illustrated), and acquires a presence position, a moving direction, a moving speed, and the like (hereinafter, collectively referred to as "position information") of the vehicle 12 (not illustrated), i.e., the vehicle 12 in which the terminal apparatus 14 is mounted based on data supplied from the GPS receiver, the gyroscope, the vehicle speed sensor, and the like. The presence position is represented by the longitude and the latitude. The position information can be acquired using a known technique, and thus a description thereof will not be made here. The generating unit 64 receives the message header from the transfer deciding unit 90. The generating unit 64 includes the position information in the data payload using the MAC frame illustrated in FIGS. 5(a) and (b). The generating unit 64 generates a packet signal including a MAC frame, and broadcasts the generated packet signal through the modem unit 54, the RF unit 52, and the antenna 50 at the transmission timing decided in the selecting unit 92 or the carrier sense 94. The transmission timing is included in the inter vehicle transmission period.

The detecting unit 118 sequentially receives identification numbers included in packet signals extracted by the extracting unit 66 from the processing unit 56. The identification number is uniquely allocated to another terminal apparatus 14 which is a broadcasting source of a packet signal. The detecting unit 118 stores a newly received identification number in the storage unit 116, and monitors a reception status of each identification number. When it is detected that the same identification number has been received by a threshold or more during a predetermined period, the detecting unit 118 outputs a switching instruction to the mode setting unit 110. For example, the predetermined period may be set to 10 minutes, and the threshold may be set to ten thousands times. In other words, the detecting unit 118 detects that a packet signal including the same identification number is continuously received more than once during a certain degree of period.

A process of outputting a switching instruction may be performed as follows. When the identification number is received, the detecting unit 118 increases a count of the identification number by "one." The detecting unit 118 calculates a proximity time by multiplying a count value. When the proximity time is a threshold or more, the detecting unit 118 outputs the switching instruction to the mode setting unit 110. As the switching instruction is output, the storage unit 116 stores an identification number included in a packet signal extracted by the extracting unit 66 as a log.

The mode setting unit 110 selects the first mode or the second mode as a broadcast mode of the RF unit 52 and the processing unit 56. The mode setting unit 110 selects the first mode in a usual case. When the switching instruction is received from the detecting unit 118, the mode setting unit 110 selects the second mode instead of the first mode. In other words, when a packet signal including the same identification number has been continuously received more than once during a certain degree of period, the detecting unit 118 performs switching from the first mode to the second mode. When a predetermined period elapses after switching to the second mode is performed, the mode setting unit 110 may select the first mode again.

When the mode setting unit 110 selects the first mode, the generating unit 64 includes an identification number uniquely allocated to the present terminal apparatus 14 in a packet signal. The identification number uniquely allocated to the present terminal apparatus 14 corresponds to an identification number peculiarly allocated to the present terminal apparatus 14. The RF unit 52 sets the first transmission power, and amplifies the packet signal. The RF unit 52 broadcasts the amplified packet signal. Meanwhile, when the mode setting unit 110 selects the second mode, the generating unit 64 includes an identification number commonly allocated in the communication system 100 of terminal-to-terminal communication in a packet signal. Specifically, a plurality of identification numbers are reserved in the communication system 100, and the generating unit 64 stores the plurality of identification numbers. The generating unit 64 selects one from among the plurality of identification numbers. Here, random selection is preferably made. Further, an identification number which is not an identification number commonly allocated in the communication system 100 of terminal-to-terminal communication but different from a uniquely allocated identification number may be allocated. The RF unit 52 sets the second transmission power lower than the first transmission power, and amplifies the packet signal. The RF unit 52 broadcasts the amplified packet signal.

The acquiring unit 114 acquires the position information. Since it is desirable for the acquiring unit 114 to perform the same process as in the generating unit 64, the acquiring unit 114 may be integrated with the generating unit 64. The storage unit 116 stores information related to a predetermined area. The predetermined area has a circular shape, and it is desirable to store the longitude and the latitude of the center of the circular shape in the storage unit 116. The radius of the circular shape is decided in advance. For example, one area is defined to include one intersection, and this is similarly applied to the first area 210 or the second area 212. The storage unit 116 stores the longitude and the latitude related to a plurality of areas.

The mode setting unit 110 receives the position information from the acquiring unit 114, and checks whether or not the position information acquired by the acquiring unit 114 is included in an area stored in the storage unit 116 with reference to the storage unit 116. When the position information is included in the area, the mode setting unit 110 sets third transmission power higher than the second transmission power to the RF unit 52 even when the second mode is selected. Here, the third transmission power is lower than the first transmission power. The third transmission power may be equal to the first transmission power. This process corresponds to increasing the transmission power at the position nearby the intersection even though the transmission power is suppressed by the second mode. However, when the mode setting unit 110 selects the first mode, the above described process is not performed.

The detecting unit 118 detects activation of the present terminal apparatus 14. The activation means that an operation of the terminal apparatus 14 starts by starting an engine of the vehicle 12. When the activation is detected by the detecting unit 118, the mode setting unit 110 selects the first mode regardless of the already selected broadcast mode.

The notifying unit 70 acquires a packet signal from the base station apparatus 10 (not illustrated) during the road-to-vehicle transmission period, and acquires a packet signal from another terminal apparatus 14 (not illustrated) during the inter vehicle transmission period. The notifying unit 70 notifies a driver of an approach of another vehicle 12 or the like through a monitor or a speaker in response to content of data included in the packet signal as a process on the acquired packet signal. The notifying unit 70 notifies the fact that the detecting unit 118 has received a packet signal including the same identification number more than once during a predetermined period. The notifying unit 70 may continuously perform the above notification during a period in which the mode setting unit 110 selects the second mode. At this time, the notification is made by a display of a monitor. This corresponds to informing of that the vehicle is likely to be being tracked by another vehicle 12 to the driver. The control unit 58 controls operation of the terminal apparatus 14 in general.

Figure 7:
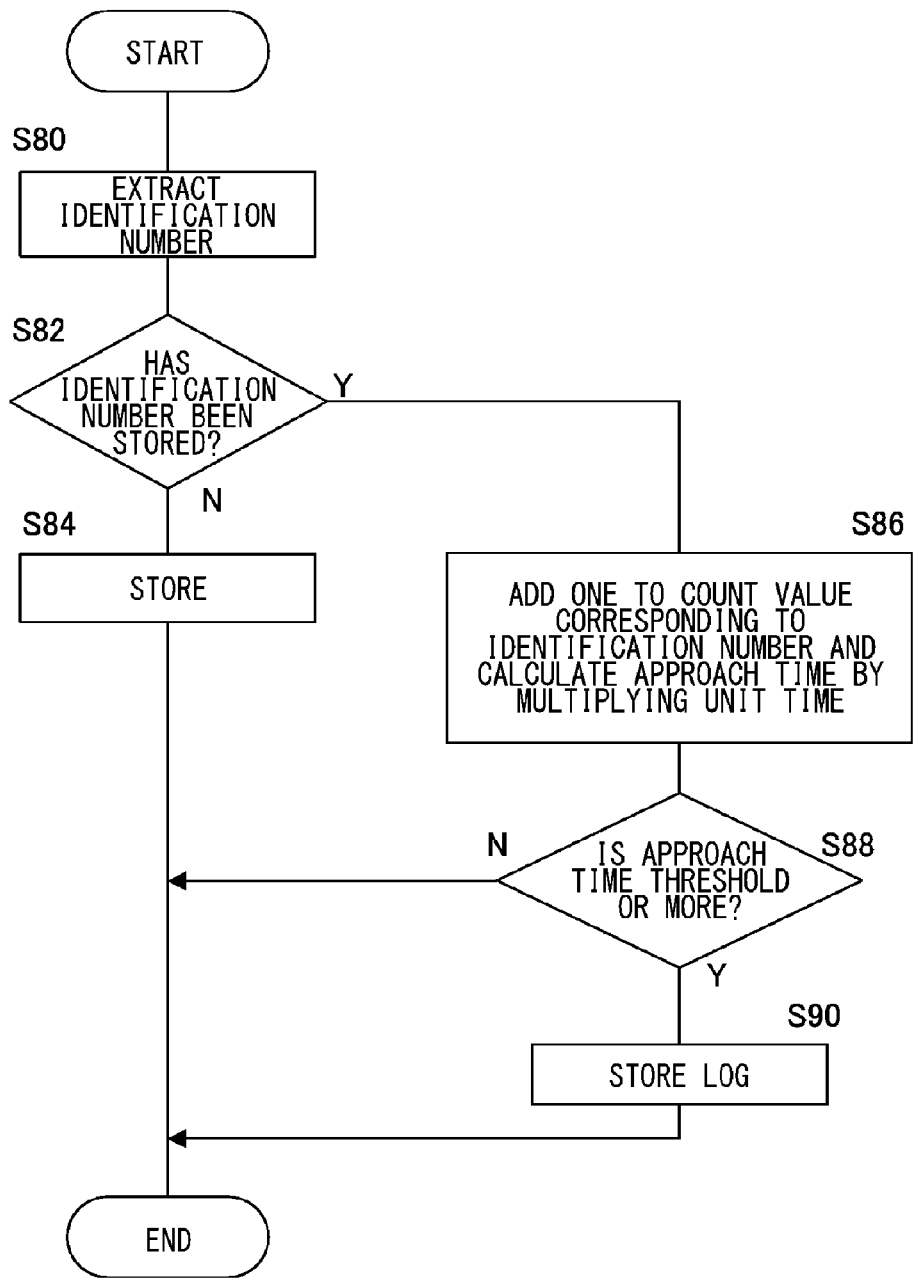
FIG. 7 is a flowchart illustrating a detecting process in the terminal apparatus of FIG. 6.

An operation of the communication system 100 having the above described configuration will be described. FIG. 7 is a flowchart illustrating a detecting process in the terminal apparatus 14. The extracting unit 66 extracts an identification number (S80). When the identification number is not stored yet (N in S82), the storage unit 116 stores the identification number (S84). However, when the identification number is already stored (Y in S82), the detecting unit 118 adds "one" to a count value of the identification number and derives a proximity time by multiplying by a unit time (S86). When the proximity time is a threshold or more (Y in S88), the storage unit 116 stores a log (S90). However, when the proximity time is not the threshold or more (N in S88), the process ends.

Figure 8:
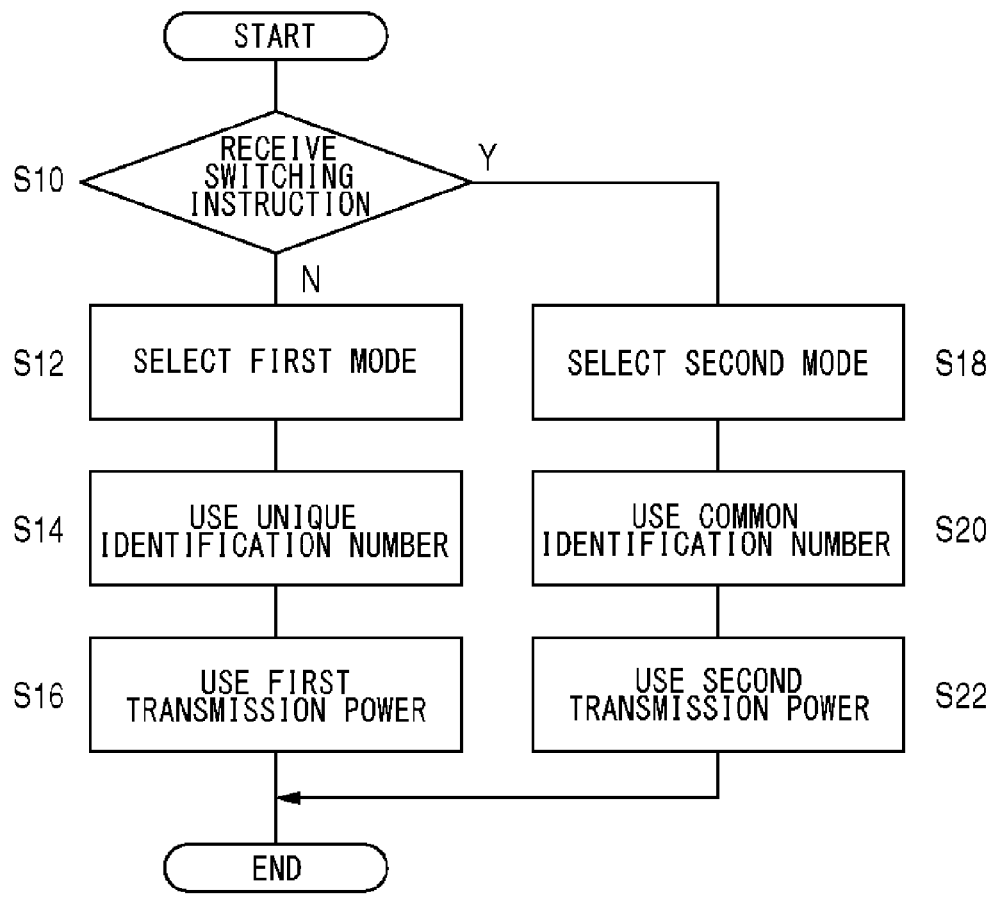
FIG. 8 is a flowchart illustrating a process of recognizing a communication status in a terminal apparatus of FIG. 6.

FIG. 8 is a flowchart illustrating a process of recognizing a communication status in the terminal apparatus 14. When a switching instruction is not received from the detecting unit 118 (N in S10), the mode setting unit 110 selects the first mode (S12). The generating unit 64 uses a unique identification number (S14), and the RF unit 52 uses the first transmission power (S16). However, when a switching instruction is received from the detecting unit 118 (Y in S10), the mode setting unit 110 selects the second mode (S18). The generating unit 64 uses a common identification number (S20), and the RF unit 52 uses the second transmission power (S22).

Figure 9:
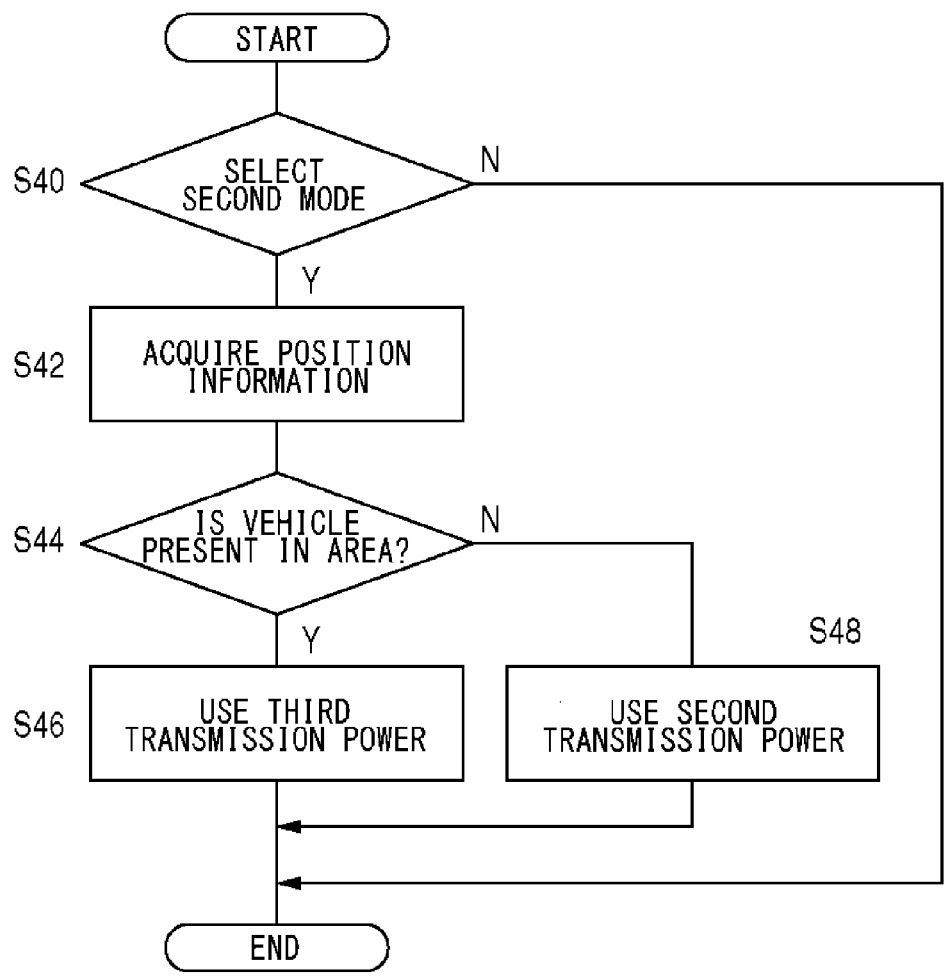
FIG. 9 is another flowchart illustrating a process of recognizing a communication status in a terminal apparatus of FIG. 6.

FIG. 9 is another flowchart illustrating a process of recognizing a communication status in the terminal apparatus 14. When the mode setting unit 110 selects the second mode (Y in S40), the acquiring unit 114 acquires the position information (S42). When the vehicle is present in an area stored in the storage unit 116 (Y in S44), the RF unit 52 uses the third transmission power (S46). However, when the vehicle is not present in an area stored in the storage unit 116 (N in S44), the RF unit 52 uses the second transmission power (S48). When the mode setting unit 110 does not select the second mode (N in S40), steps S42 to S48 are skipped.

Figure 10:
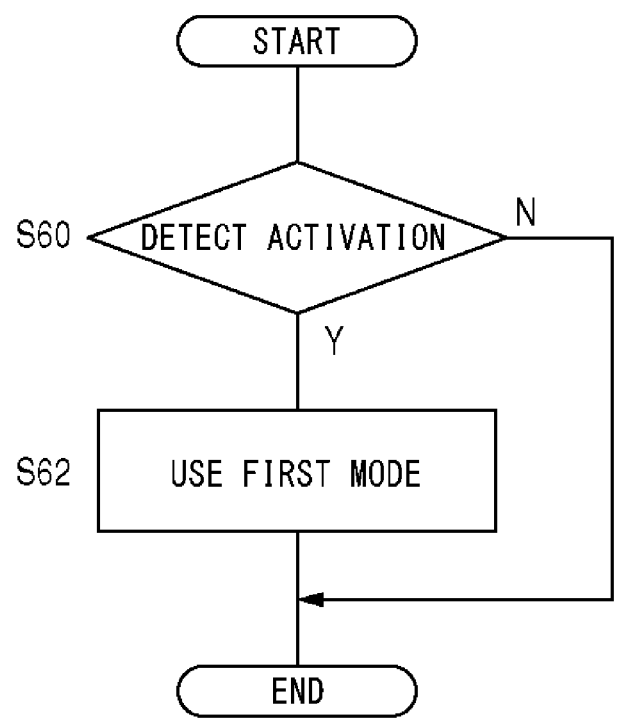
FIG. 10 is another flowchart illustrating a process of recognizing a communication status in a terminal apparatus of FIG. 6.

FIG. 10 is another flowchart illustrating a process of recognizing a communication status in the terminal apparatus 14. When the detecting unit 118 detects activation (Y in S60), the mode setting unit 110 uses the first mode (S62). However, when the detecting unit 118 does not detect activation (N in S60), step S62 is skipped.

Next, a modified embodiment will be described. In the modified embodiment of the present invention, when a driver recognizes that a vehicle is being tracked, the driver pushes a button down. As the button is pushed down, the terminal apparatus performs switching from the first mode to a mode (hereinafter, referred to as "second mode") for broadcasting a packet signal when a vehicle is being tracked. In the second mode, the terminal apparatus includes an identification number commonly allocated to the communication system in a packet signal, and then broadcasts the packet signal at transmission power (hereinafter, referred to as "second transmission power") lower than the first transmission power. The communication system 100 according to the modified embodiment is of the same type as in FIG. 1, and the base station apparatus 10 is of the same type as in FIG. 2. The following description will be made focusing on different points.

In FIG. 1, a plurality of terminal apparatuses receive a packet signal broadcasted from the base station apparatus 10, and estimates which area among the first area 210, the second area 212, and the second area outside area 214 their vehicles are present based on the reception status of the received packet signal. When it is determined that the vehicle is present in the first area 210 or the second area 212, the terminal apparatus generates a frame based on control information included in the received packet signal. As a result, a frame generated in each of a plurality of terminal apparatuses is synchronized with a frame generated in the base station apparatus 10. The terminal apparatus recognizes the road-to-vehicle transmission period set by each base station apparatus 10, and specifies the inter vehicle transmission period so as to transmit a packet signal. Specifically, when the vehicle is present in the first area 210, the priority period is specified, whereas when the vehicle is present in the second area 212, the general period is specified. Further, the terminal apparatus broadcasts a packet signal in terminal-to-terminal communication by executing TDMA during the priority period and CSMA/CA during the general period.

The terminal apparatus selects a subframe having the same relative timing even in a next frame. Particularly, the terminal apparatus selects a slot having the same relative timing in a priority period of a next frame. Here, the terminal apparatus acquires data and includes the data in a packet signal. For example, information related to a presence position is included as the data. The terminal apparatus also includes control information in the packet signal. That is, control information transmitted from the base station apparatus 10 is transferred by the terminal apparatus. Meanwhile, when it is estimated that the vehicle is present in the second area outside area 214, the terminal apparatus executes CSMA/CA regardless of a configuration of a frame and broadcasts the packet signal.

Figures 11A, 11B:
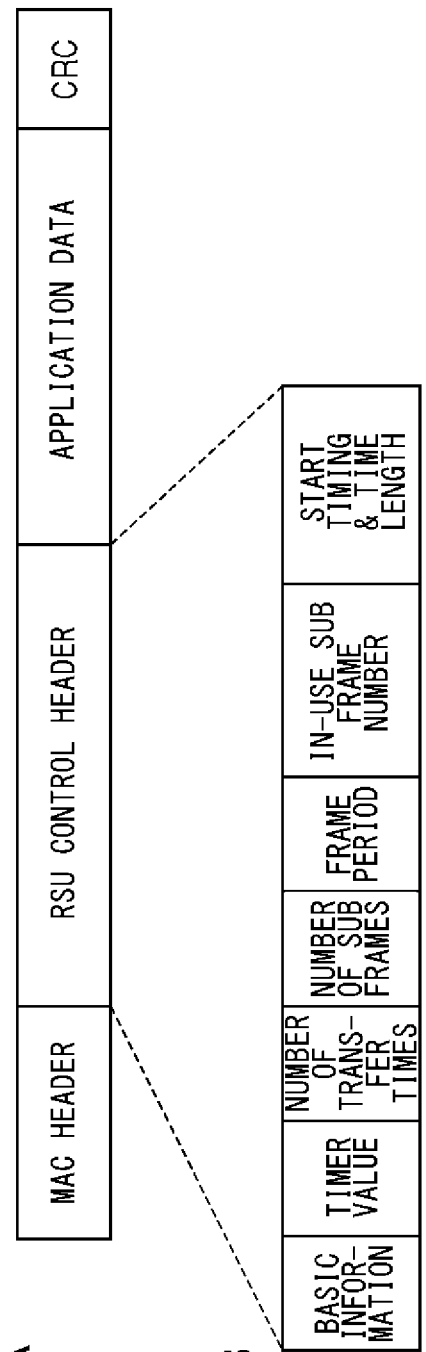
FIGS. 11(a) and 11(b) are diagrams illustrating a format of a MAC frame included in a packet signal specified in a communication system according to a modified embodiment of the present invention.

In FIG. 2, the processing unit 26 receives a demodulation result from another base station apparatus 10 or another terminal apparatus (not illustrated) through the RF unit 22 and the modem unit 24. Here, a configuration of a MAC frame included in the packet signal is described as the demodulation result. A MAC frame input to the processing unit 26 and a MAC frame output from the processing unit 26 have the same configuration. FIGS. 11(a) and 11(b) illustrate a format of a MAC frame included in a packet signal specified in the communication system 100. FIG. 11(a) illustrates a format of a MAC frame. The MAC frame is configured such that a "MAC header," an "RSU control header," an "application data," and a "CRC" in order from the head. The RSU control header corresponds to the above described control information. The application data includes data to be broadcasted to the terminal apparatus such as accident information.

FIG. 11(b) illustrates a format of the RSU control header. The RSU control header is configured such that a "basic information," a "timer value," a "number of transfer times," a "number of subframes," a "frame period," an "in-use subframe number," and a "start timing & time length" are arranged in order from the head. A configuration of the RSU control header is not limited to FIG. 11(b). Some of elements may be excluded from the above configuration, and another element may be added to the above configuration. The number of transfer times represents the number of times that the control information transmitted from the base station apparatus 10, particularly, the content of the RSU control header is transferred by the terminal apparatus (not illustrated). Here, for the MAC frame output from the processing unit 26, the base station apparatus 10 corresponds to the present base station apparatus 10, where for the MAC frame input to the processing unit 26, the base station apparatus 10 corresponds to another base station apparatus 10. This is similarly applied to the following description.

For the MAC frame output from the processing unit 26, the number of transfer times is set to "0." Further, for the MAC frame input to the processing unit 26, the number of transfer times is set to "0" or more. The number of subframes represents the number of subframes specified in one frame. The frame period represents a period of a frame and is set, for example to "100 msec" as described above. The in-use subframe number represents a number of a subframe to which the inter vehicle transmission period is set by the base station apparatus 10. As illustrated in FIG. 3(a), a subframe number in the head of a frame is set to "1". The start timing & time length represents start timing of the road-to-vehicle transmission period which is used as the head of a subframe and a time length of the road-to-vehicle transmission period. The description will continue with reference back to FIG. 2.

Here, a description will be made in connection with a process of selecting a subframe to which the road-to-vehicle transmission period is to be set. This corresponds to generating a frame, which is synchronized with timing of a frame generated by another base station apparatus 10, through the processing unit 26. The processing unit 26 extracts a MAC frame in which the number of transfer times is set to "0" among MAC frames. This corresponds to a packet signal transmitted directly from another base station apparatus 10. The processing unit 26 specifies a value of the in-use subframe number in the extracted MAC frame. This corresponds to specifying a subframe used by another base station apparatus 10. The processing unit 26 measures reception power of a packet signal arranged in the head of the already specified subframe. This corresponds to measuring reception power of a packet signal from another base station apparatus 10.

The processing unit 26 extracts a MAC frame in which the number of transfer times is set to "1" or more among MAC frames. This corresponds to a packet signal which is transmitted from another base station apparatus 10 and then transferred by the terminal apparatus. The processing unit 26 specifies a value of the in-use subframe number in the extracted MAC frame. This corresponds to specifying a subframe used by another base station apparatus 10. The terminal apparatus transfers a subframe number of a packet signal which the terminal apparatus has received from another base station apparatus 10.

The processing unit 26 measures reception power of these packet signals. The processing unit 26 estimates that the acquired received signal has reception power of a packet signal from another base station apparatus 10 that has transferred the control information through the corresponding packet signal. The processing unit 26 specifies a subframe to which the road-to-vehicle transmission period is to be set. Specifically, the processing unit 26 checks whether or not a "non-used" subframe is present. When a "non-used" subframe is present, the processing unit 26 selects any one of non-used subframes. Here, when a plurality of subframes are not used yet, the processing unit 26 randomly selects one subframe. However, when a "non-used" subframe is not present, that is, when all of a plurality of subframes are being used, the processing unit 26 preferentially specifies a subframe having small reception power.

The processing unit 26 sets the road-to-vehicle transmission period to the head portion of the subframe having the specified subframe number. The processing unit 26 generates a MAC frame to be included in a packet signal. At this time, in response to setting of the road-to-vehicle transmission period, the processing unit 26 decides a value of the RSU control header of the MAC frame. This corresponds to the control information related to a configuration of a frame. The processing unit 26 acquires predetermined information through the network communication unit 80 and includes the predetermined information in the application data. Here, the network communication unit 80 is connected to the network 202 (not illustrated). The processing unit 26 causes the modem unit 24 and the RF unit 22 to broadcast the packet signal during the road-to-vehicle transmission period. Here, the packet signal includes the control information and identification information for identifying the present base station apparatus 10. The identification information for identifying the present base station apparatus 10 is included in the MAC header illustrated in FIG. 11(a). The control unit 30 controls processing of the base station apparatus 10 in general.

Figure 12:
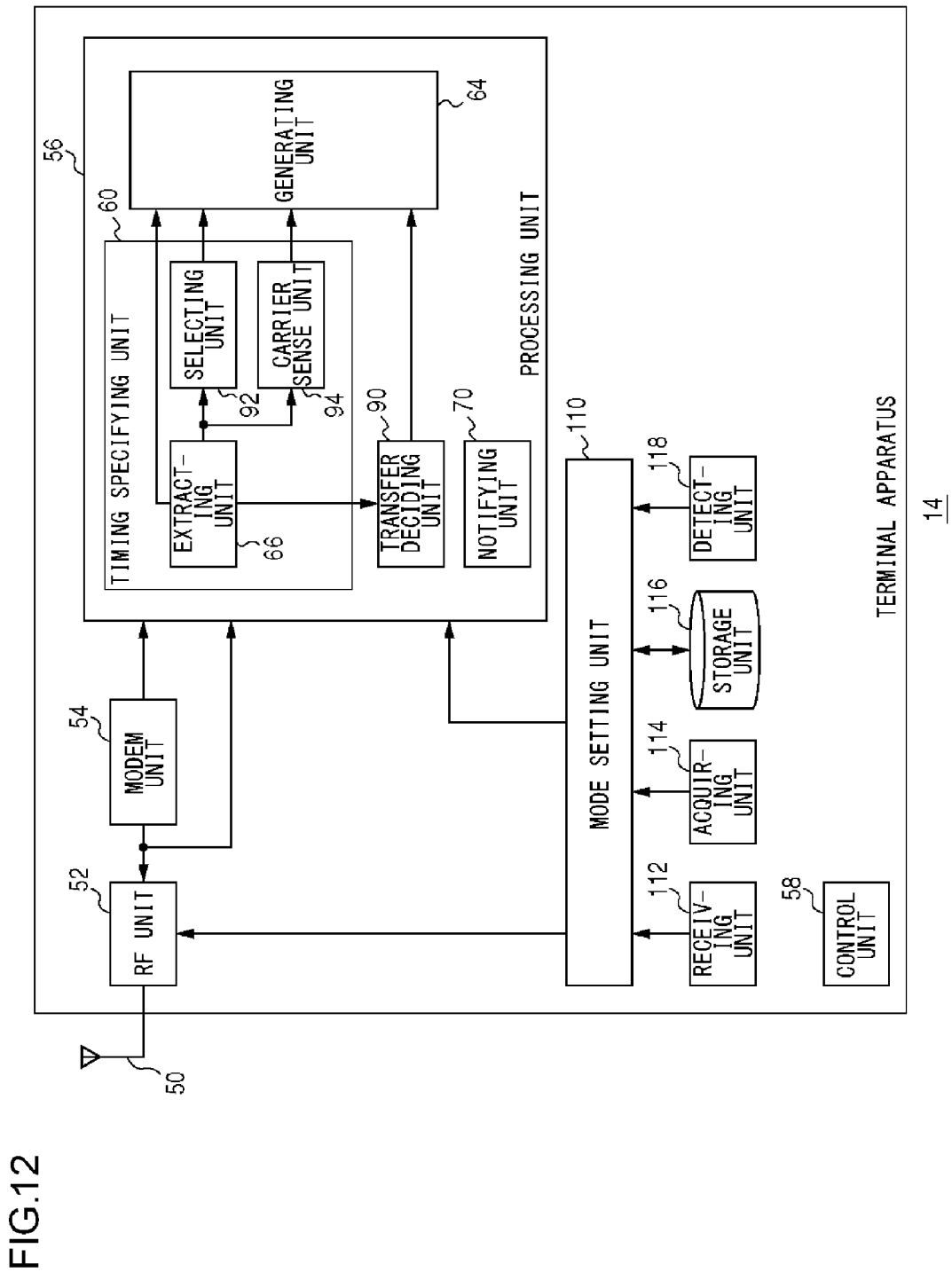
FIG. 12 is a diagram illustrating the configuration of a terminal apparatus according to the modified embodiment of the present invention.

FIG. 12 illustrates a configuration of the terminal apparatus 14 mounted in the vehicle 12. The terminal apparatus 14 includes an antenna 50, an RF unit 52, a modem unit 54, a processing unit 56, a control unit 58, a mode setting unit 110, a receiving unit 112, an acquiring unit 114, a storage unit 116, and a detecting unit 118. The processing unit 56 includes a generating unit 64, a timing specifying unit 60, a transfer deciding unit 90, and a notifying unit 70. The timing specifying unit 60 includes an extracting unit 66, a selecting unit 92, and a carrier sense unit 94. The antenna 50, the RF unit 52, and the modem unit 54 execute the same process as the antenna 20, the RF unit 22, and the modem unit 24 of FIG. 2. Thus, a description will be here made focusing on different points.

The modem unit 54 and the processing unit 56 receives a packet signal from another terminal apparatus 14 or the base station apparatus 10 (not illustrated). As described above, a subframe in which the priority period and the general period are time-multiplexed is specified, and the road-to-vehicle transmission period is time-multiplexed in a subframe. The road-to-vehicle transmission period refers to a period during which a packet signal from the base station apparatus 10 can be broadcasted. Here, the modem unit 54 and the processing unit 56 receive a packet signal from the base station apparatus 10 during the road-to-vehicle transmission period. The packet signal includes identification information for identifying the base station apparatus 10 which is a broadcast source of the packet signal. The priority period refers to a period which the terminal apparatus 14 present in the first area 210 defined around the base station apparatus 10 uses to broadcast the packet signal. The priority period includes a plurality of slots. The general period refers to a period which the terminal apparatus 14 present in the second area defined outside the first area 210 uses to broadcast the packet signal. Further, a frame in which a plurality of subframes are time-multiplexed is specified.

The extracting unit 66 measures reception power of the packet signal from the base station apparatus 10. The extracting unit 66 estimates which area among the first area 210, the second area 212, and the second area outside area 214 the vehicle is present in based on the measured reception power. For example, the extracting unit 66 stores a first area determination threshold and a second area determination threshold. Here, the first area determination threshold is specified to be larger than the second area determination threshold. When the reception power is larger than the first area determination threshold, the extracting unit 66 decides that the vehicle is present in the first area 210. However, when the reception power is the first area determination threshold or less but larger than the second area determination threshold, the extracting unit 66 decides that the vehicle is present in the second area 212. Further, when the reception power is the second area determination threshold or less, the extracting unit 66 decides that the vehicle is present outside the second area 212. The extracting unit 66 may use the error rate or a combination of the reception power and the error rate, instead of the reception power.

The extracting unit 66 decides any one of the priority period, the general period, and timing unrelated to a configuration of a frame as a transmission period based on the estimation result. Specifically, when it is estimated that the vehicle is present in the second area outside area 214, the extracting unit 66 selects timing unrelated to a configuration of a frame. The extracting unit 66 selects the general period when it is estimated that the vehicle is present in the second area 212. The extracting unit 66 selects the priority period when it is estimated that the vehicle is present in the first area 210.

When the demodulation result from the modem unit 54 is the packet signal from the base station apparatus 10 (not illustrated), the extracting unit 66 specifies timing of a subframe in which the road-to-vehicle transmission period is arranged. The extracting unit 66 generates a frame based on timing of a subframe and the content of the RSU control header. Since it is desirable to generate the frame in the same way as in the processing unit 26, a description thereof will not be made here. As a result, the extracting unit 66 generates a frame synchronized with a frame defined in the base station apparatus 10. The extracting unit 66 specifies the road-to-vehicle transmission period based on the content of the RSU control header.

When the priority period is selected, the extracting unit 66 outputs information related to the priority period to the selecting unit 92. When the general period is selected, the extracting unit 66 outputs timing of a frame and information related to a subframe and the inter vehicle transmission period to the carrier sense unit 94. When timing unrelated to a configuration of a frame is selected, the extracting unit 66 instructs the carrier sense unit 94 to execute the carrier sense. The selecting unit 92 receives information related to the priority period from the extracting unit 66. The selecting unit 92 selects any one slot from among a plurality of slots included in the priority period and decides the selected slot as transmission timing. Here, the slot may be selected using the reception power. For example, a slot having small reception power is selected. The selecting unit 92 notifies the generating unit 64 of the decided transmission timing.

The generating unit 64 includes a GPS receiver, a gyroscope, a vehicle speed sensor, and the like (not illustrated), and acquires a presence position, a moving direction, a moving speed, and the like of the vehicle 12 (not illustrated), i.e., the vehicle 12 in which the terminal apparatus 14 is mounted based on data supplied from the GPS receiver, the gyroscope, the vehicle speed sensor, and the like. The presence position is represented by the longitude and the latitude. The above information can be acquired using a known technique, and thus a description thereof will not be made here. The generating unit 64 includes the presence position in the application data using the MAC frame illustrated in FIGS. 11(*a*) and 11(*b*). The generating unit 64 receives identification information from the extracting unit 66 and includes most recently received identification information in the application data. The generating unit 64 generates a packet signal including MAC frame, and broadcasts the generated packet signal through the modem unit 54, the RF unit 52, and the antenna 50 at transmission timing decided by the selecting unit 92 or the carrier sense unit 94. The transmission timing is included in the inter vehicle transmission period.

The transfer deciding unit 90 controls transfer of the RSU control header. The extracting unit 66 extracts the RSU control header from the packet signal whose information source is the base station apparatus 10. As described above, when the packet signal is transmitted directly from the base station apparatus 10, the number of transfer times is set to "0", however, when the packet signal is transmitted from another terminal apparatus 14, the number of transfer times is set to a value of "1 or more". Here, since the in-use subframe number is not changed when transfer is made by the terminal apparatus 14, a subframe used by the base station apparatus 10 which is the information source is specified with reference to the in-use subframe number.

The transfer deciding unit 90 acquires information related to the number of times of transfer for each base station apparatus 10 which is the information source. Specifically, the transfer deciding unit 90 sequentially acquires the number of transfer times associated with the subframe number "1", and then executes the same process on the number of transfer times associated with other subframe numbers. Further, the transfer deciding unit 90 acquires a smaller number of transfer times, for example, a minimum value of the number of transfer times, from among information related to the number of transfer times associated with the corresponding the base station apparatus 10 for each base station apparatus 10 which is the information source. That is, the transfer deciding unit 90 acquires a minimum value of the number of transfer times associated with the subframe number "1", a minimum value of the number of transfer times associated with the subframe number "2", and the like.

The transfer deciding unit 90 measures the number of times that the RSU control header, i.e., the control information is extracted for each base station apparatus 10 which is the information source. The transfer deciding unit 90 selects the number of times that the control information is extracted that includes a value of the number of transfer times acquired by the transfer deciding unit 90 for each base station apparatus 10 which is the information source. Specifically, the transfer deciding unit 90 measures the number of times that the control information is extracted on one subframe number for each number of transfer times. As a result, for example, for the subframe number "1", the number of times that the control information whose number of transfer times is "0" times is extracted is "0" times, the number of times that the control information whose number of transfer times is "once" is extracted is "4" times, and the number of times that the control information whose number of transfer times is "twice" is extracted is "6" times. Further, when the acquired number of transfer times is "once", the transfer deciding unit 90 selects "4" as the number of times that the control information including the number of transfer times is extracted.

The transfer deciding unit 90 stores the subframe number, the number of transfer times, and the number of extraction times in association with one another. When the number of transfer times or the number of extraction times is updated, the transfer deciding unit 90 updates the storage content. The transfer deciding unit 90 acquires the number of transfer times and the number of extraction times on each base station apparatus 10. The transfer deciding unit 90 selects the control information corresponding to at least one base station apparatus 10 as the control information to be transferred based on the number of transfer times and the number of extraction times. Specifically, the transfer deciding unit 90 compares the number of transfer times of a plurality of base station apparatuses 10 and then compares the number of extraction times of a plurality of base station apparatuses 10. In other words, the control information having the small number of transfer times, for example, the control information having the smallest number of transfer times is selected, and then the control information having the large number of extraction times, for example, the largest number of extraction times is selected from among the selected control information.

As described above, the control information that has the smallest number of transfer times and has the largest number of extraction times associated with the corresponding number of transfer times is selected by the transfer deciding unit 90. The small number of transfer times represents that the control information is being received near the base station apparatus 10 which is the information source. Further, the large number of extraction times represents that the control information is being received in a situation in which a change in wireless environment is small. Thus, by selecting the control information satisfying the above described situation, the terminal apparatus 14 is selecting the control information from the base station apparatus 10 arranged as close as possible.

The transfer deciding unit 90 instructs the generating unit 64 to generate the RSU control header based on the selected control information. The transfer deciding unit 90 increases the number of transfer times in information related to the number of transfer times when the control information is included in the RSU control header. The generating unit 64 generates the RSU control header based on the control information selected by the transfer deciding unit 90 in response to the instruction, and increases the number of transfer times at that time.

The mode setting unit 110 selects the first mode or the second mode as the broadcast mode of the RF unit 52 and the processing unit 56. The mode setting unit 110 selects the first mode in a usual case. The receiving unit 112 is connected to a button and receives the driver's instruction through the button. For example, when the mode setting unit 110 selects the first mode, the driver pushes the button down when he/she feels that his/her vehicle is being tracked by another vehicle 12. As the button is pushed down, the receiving unit 112 receives a switching instruction from the first mode to the second mode. The receiving unit 112 outputs the switching instruction to the mode setting unit 110. When the switching instruction is received from the receiving unit 112, the mode setting unit 110 selects the second mode instead of the first mode. When a predetermined period elapses after the second mode is selected, the mode setting unit 110 may select the first mode again.

According to an embodiment of the invention, when the packet signal including the same identification number is received more than once during a predetermined period, the fact is notified, and thus the driver can be informed of the fact that the vehicle is likely to be being tracked by another vehicle. Further, since the fact that the vehicle is likely to be being tracked by another vehicle is informed, the driver can be informed of a risk. Further, when the packet signal including the same identification number is received more than once during a predetermined period, it is decided to perform switching from the first mode to the second mode, and thus a risk that the vehicle in which the terminal apparatus is mounted may be tracked can be reduced. Further, since the identification number is recorded as a log, when an accident or the like happens, it can be an investigation target. Further, when the vehicle is being tracked by another vehicle, a unique identification number is changed to a common identification number, and transmission power is reduced, so that continuous tracking can be suppressed. Further, since a unique identification number is changed to a common identification number, it is difficult to specify the present terminal apparatus. Further, a plurality of common identification numbers are reserved, and one among them is randomly selected used. Thus, even when the common identification number is used, a probability that the same identification number will be used can be reduced. Further, since the transmission power is reduced, a distance at which a packet signal can be received can be reduced.

Further, even in the second mode, when the vehicle is present in a predetermined area, the transmission power is increased, and thus a distance at which a packet signal can be received can be increased. Further, since distance at which a packet signal can be received is increased, a reception probability of a packet signal can be improved. Further, when a predetermined area is set near an intersection, a reception probability of a packet signal is improved, and thus the fact that the vehicle in which the present terminal apparatus is mounted enters an intersection can be notified. Further, since the fact that the vehicle in which the present terminal apparatus is mounted enters an intersection is notified, a collision between vehicles can be prevented. Since the first mode is returned at the time of activation, it is prevented to forget returning from the second mode to the first mode.

Since the reception power is used in discriminating the first area from the second area, a range in which propagation loss is settled at a predetermined level can be specified as the first area. Further, since a range in which propagation loss is settled at a predetermined level is specified as the first area, an area around the center of an intersection can be used as the first area. Further, since time division multiplexing by a slot is executed in the priority period, the error rate can be reduced. Further, since CSMA/CA is executed in the general period, the number of terminal apparatuses can be flexibly adjusted.

Further, a subframe used by another base station apparatus is specified based on a packet signal received from a terminal apparatus as well as a packet signal received directly from another base station apparatus. Thus, the accuracy of specifying an in-use subframe can be improved. Further, since the accuracy of specifying an in-use subframe is improved, a probability that packet signals transmitted from the base station apparatuses will collide with each other can be reduced. Further, since a probability that packet signals transmitted from the base station apparatuses will collide with each other is reduced, the terminal apparatus can accurately recognize the control information. Since the control information is accurately recognized, the road-to-vehicle transmission period can be accurately recognized. Further since the road-to-vehicle transmission period is accurately recognized, a probability that packet signals will collide with each other can be reduced.

Further, since a subframe other than an in-use subframe is preferentially used, a possibility that a packet signal will be transmitted at the same timing as a packet signal from another base station apparatus can be reduced. Further, when any subframe is being used by another base station apparatus, a subframe having low reception power is selected, and thus influence of interference of a packet signal can be reduced. Further, reception power of a terminal apparatus is used as reception power from another base station which is a transmission source of control information relayed by the corresponding terminal apparatus. Thus, a process of estimating reception power can be simplified.

Further, when a vehicle is being tracked by another vehicle, a unique identification number is changed to a common identification number, and transmission power is reduced, so that continuous tracking can be suppressed. Further, since a unique identification number is changed to a common identification number, it is difficult to specify the present terminal apparatus. Further, a plurality of common identification numbers are reserved, and one among them is randomly selected and used. Thus, even when the common identification number is used, a probability that the same identification number will be used can be reduced. Further, since the transmission power is reduced, a distance at which a packet signal can be received can be reduced.

Hereinbefore, the embodiments of the invention have been described. The above embodiments are exemplary, and a combination of respective components or respective processing processes can be modified, and it should be understood by those skilled in the art that such a modified embodiment is within the scope of the invention.

What is claimed is:

1. A terminal apparatus adapted for inter-terminal communication comprising:
    a communication unit configured to receive a packet signal which is a packet signal broadcasted from another terminal apparatus and includes an identification number for identifying the another terminal apparatus; and
    a notifying unit configured to notify that a packet signal including the same identification number has been received more than once during a predetermined period when the communication unit has received the packet signal including the same identification number more than once during the predetermined period,
    a processing unit configured to generate a packet signal to be broadcasted through the communication unit and to process a packet signal received by the communication unit; and
    a selecting unit configured to select a first mode or a second mode as a broadcast mode of the communication unit, wherein
    the communication unit sets first transmission power when the selecting unit selects the first mode and sets second transmission power lower than the first transmission power when the selecting unit selects the second mode,
    the processing unit includes an identification number uniquely allocated to the present terminal apparatus in a packet signal when the selecting unit selects the first mode, and includes an identification number different from the uniquely allocated identification number in a packet signal when the selecting unit selects the second mode, and
    the selecting unit selects the second mode when the communication unit has received the packet signal including the same identification number more than once during the predetermined period.

2. The terminal apparatus according to claim 1, further comprising a storage unit configured to store an identification number included in a packet signal received by the communication unit as a log.

3. The terminal apparatus according to claim 1, wherein the identification number different from the identification number uniquely allocated to the terminal apparatus is an identification number commonly allocated to a communication system formed by terminal apparatuses.

4. The terminal apparatus according to claim 1, wherein the selecting unit selects the first mode when a predetermined time elapses since the second mode is selected.

5. The terminal apparatus according to claim 1, further comprising:
    a detecting unit configured to detect activation of the terminal apparatus, wherein
    when the detecting unit detects activation, the selecting unit selects the first mode regardless of an already selected broadcast mode.

* * * * *